United States Patent [19]
Cheatham

[11] 4,025,824
[45] May 24, 1977

[54] TRANSFORMER SUPPORT RACK
[76] Inventor: Harry P. Cheatham, 201 Pickens Lane, Columbia, Tenn. 38401
[22] Filed: Feb. 12, 1976
[21] Appl. No.: 657,617
[52] U.S. Cl. .............................. 361/332; 174/45 R; 336/67; 361/369
[51] Int. Cl.² .......................................... H02B 9/00
[58] Field of Search .................. 174/43, 44, 45 R; 336/67; 317/99, 103, 104

[56] References Cited
UNITED STATES PATENTS
1,867,394  7/1932  Acky ............................. 174/45 R
2,977,402  3/1961  Parkison ........................ 174/45 R
3,653,622  4/1972  Farmer .......................... 174/45 R Primary Examiner—Gerald P. Tolin
Attorney, Agent, or Firm—Harrington A. Lackey

[57] ABSTRACT

A support rack for mounting at least one electrical current transformer upon an electrical utility pole, including a bracket for each current transformer, a hollow arm connecting each bracket to a hollow junction box having a depending conduit connection to an electrical meter mounted on the same pole, so that one set of wires from the current transformers are led through the arms and the junctions box to the meter at a substantially lower secondary voltage than the secondary wires leading from the current transformers to the customer service lines.

8 Claims, 3 Drawing Figures

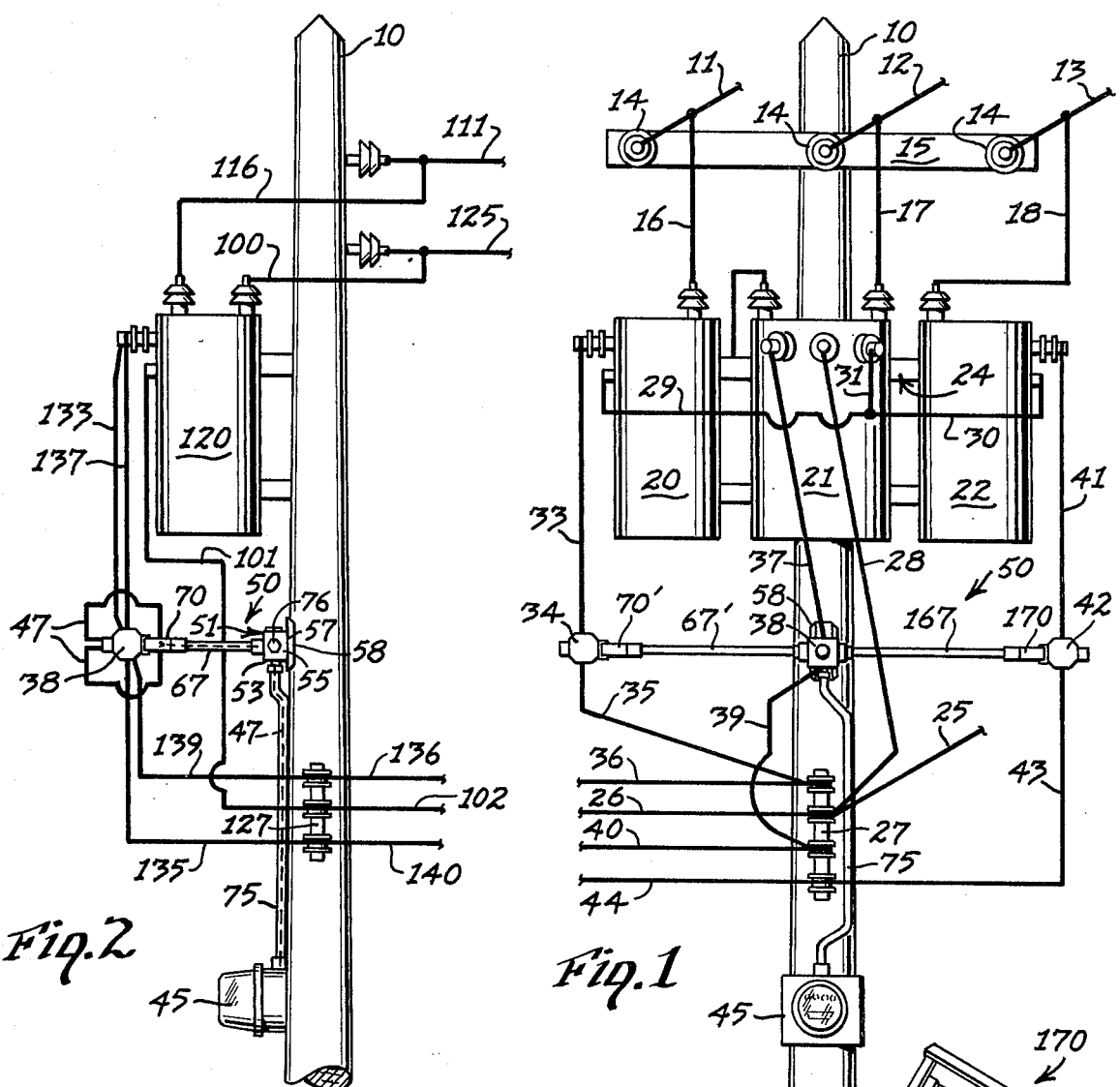
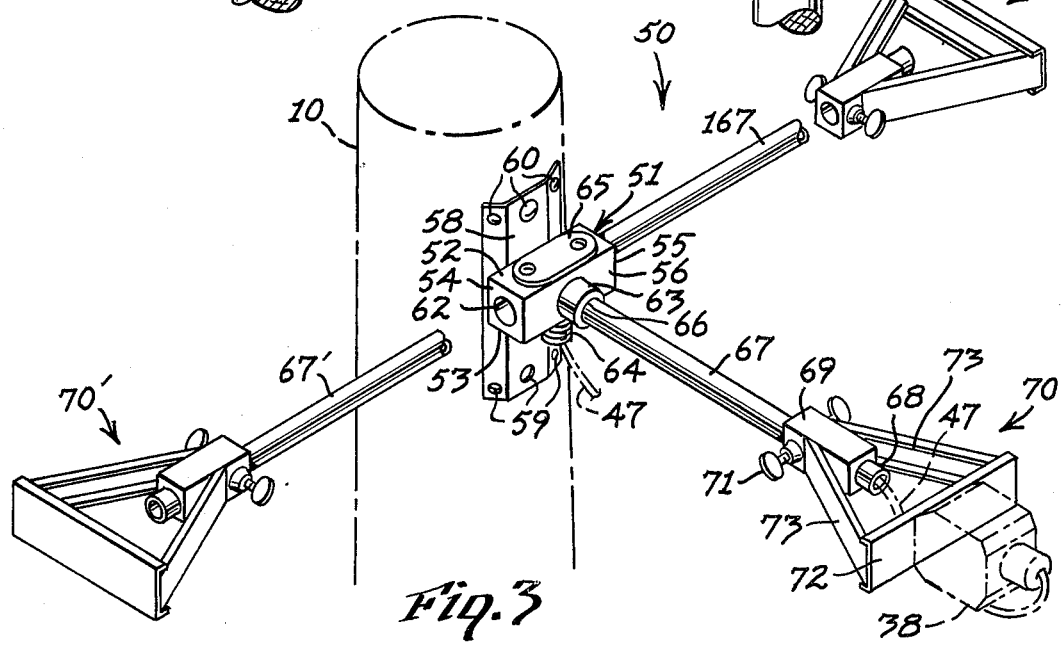

TRANSFORMER SUPPORT RACK

BACKGROUND OF THE INVENTION

This invention relates to an electrical power distribution system, and more particularly to a rack for supporting current transformers on a utility pole.

In a conventional electrical power distribution system, a cluster of power transformers are mounted near the top of a utility pole and are connected to the power lines from the substation for transferring the primary voltage to the power transformers. Secondary voltage from the power transformers is transmitted through secondary conductors to the consumer or customer at lower voltages. Some of the secondary voltage is transmitted from the power transformer through appropriate lines to current transformers, which in turn reduce the current and the voltage for transmitting the further reduced voltage to the electrical meter in order to protect the meter from excessive currents.

Because of the numerous equipment components, such as the customary three power transformers and their brackets, the three current transformers, the meter and the numerous lines connecting all of these components on one utility pole, the arrangement is often haphazard, confusing and difficult to install and maintain.

SUMMARY OF THE INVENTION

It is therefore an object of this invention to provide in a power distribution system, including a utility pole, power transformers, customer service lines and an electrical meter, a rack adapted to be mounted upon the utility pole for supporting the current transformers in spaced apart relationship to maintain distinct avenues or routes for the various conductor wires attached to the current transformers.

More specifically, the transformer support rack made in accordance with this invention includes a hollow junction box fixed to a mounting plate or bracket adapted to be secured and fixed to the utility pole below the power transformers and above the electrical meter. Emanating from the hollow junction box in divergent directions are at least one, and usually three, horizontally extending tubular arms, to the outer ends of which is fixed a transformer supporting bracket. Each hollow arm is open-ended to permit electrical leads or wires to extend from the current transformer supported upon the transformer rack through each hollow arm to the junction box and then downward through a depending conduit to the electrical meter. Secondary voltage wires from each of the power transformers are connected to corresponding current transformers and thence through each of the secondary transformers to the customer service wires, without interfering with the meter wires extending through the arms and the junction box to the meter.

The junction box has a plurality of horizontal openings for receiving one or more of the hollow arms, and is provided with closure plugs for closing those openings not receiving a hollow arm.

BRIEF DESCRIPTION OF THE DRAWINGS

FIG. 1 is a fragmentary front elevation of a utility pole supporting a three-phase, alternating current, power transmission system, including the current transformer rack in operative position;

FIG. 2 is a fragmentary side elevation of an electrical utility pole supporting a single-phase electrical transmission system, including the current transformer rack, as modified, in operative position; and FIG. 3 is a front top perspective view, with portions broken away, of the rack mounted on a utility pole, shown in phantom, in operative position for a three-phase power distribution system.

DESCRIPTION OF THE PREFERRED EMBODIMENTS

Referring now to the drawings in more detail, FIG. 1 discloses a utility pole 10 supporting a four-wire, three-phase AC electrical power distribution system. The three power lines 11, 12 and 13 are supported on insulators 14 on a cross-arm 15 near the top of the utility pole 10. Primary leads 16, 17 and 18 connect the respective power lines 11, 12 and 13 to the respective power transformers 20, 21 and 22 mounted on a power transformer bracket 24 fixed to the utility pole 10.

The system neutral line 25 is connected to the customer service neutral line 26 at the insulator bracket 27 mounted on the utility pole 10. Transformer 21 is connected to the neutral lines 25 and 26 through its neutral lead 28, and transformers 20 and 22 are connected through the neutral lines 29, 30 and 31.

Secondary line 33 connects power transformer 20 to the current transformer 34, and secondary line 35 connects current transformer 34 to the customer secondary line 36 through the insulator bracket 27. In a similar manner, a secondary line 37 connects power transformer 21 to current transformer 38, and secondary line 39 connects current transformer 38 to the customer secondary line 40 through the insulator bracket 27. Also, secondary line 41 connects power transformer 22 to current transformer 42, while secondary line 43 connects current transformer 42 to the customer secondary line 44 through the insulator bracket 27.

Electrical meter 45 is mounted upon the utility pole 10 below the insulator bracket 27 and is connected through the meter wires 47 (FIGS. 2 and 3) to the respective current transformers 34, 38 and 42.

The parts thus far disclosed are known in the art of electrical power distribution.

The purpose of the current transformers 34, 38 and 42 is to substantially reduce the secondary current from each of the power transformers 20, 21 and 22, respectively, and to transmit an accurate portion of the secondary line current through the meter wires 47 to the meter 45.

The purpose of this invention is to provide the support rack 50 which is capable of supporting all of the current transformers 34, 38 and 42 in an orderly and separated arrangement, to maintain all of the secondary lines 33, 35, 37, 39, 41 and 44 completely separated and radially away from the utility pole 10, while providing definite avenues or conduits for the meter wires 47 to the meter 45 completely separated and insulated from the other components of the transmission system.

The rack 50 includes a hollow junction box 51 preferably in a parallelepiped shape having a top wall 52, a bottom wall 53, opposite end walls 54 and 55, an outer side wall 56, and in inner side wall 57 (FIG. 2) fixed to a pole-mounting bracket 58. The particular mounting bracket 58 is disclosed in the form of a plate bent transversely to conform to the circular contour of the utility pole 10, and having holes 59 therethrough for receiving screws 60, or other fastening means, for rigidly fixing the pole plate 58 in an upright position, as disclosed in the drawings.

Formed in each of the end walls 54 and 55 is a circular opening 62 of uniform diameter.

Projecting outward from the outer wall 56 is a circular sleeve boss 63 having a circular opening 66 extending entirely through the side wall 56, and of the same diameter as the opening 62.

Depending from the bottom wall 53 of the junction box 51 is an externally threaded connector 64 having an axial opening extending entirely through the bottom wall 53 to communicate with the interior of the hollow junction box 51.

If desired, the top wall 52 may be provided with an inspection opening, not shown, closed by the cover plate 65.

An elongated, tubular, rigid conduit or arm 67 has both ends open and has its proximate end portion of a diameter substantially equal to the diameter of the opening 66 in the sleeve boss 63, so that the proximate end portion of the arm 67 is snugly received within the sleeve boss 63.

The remote end portion 68 of the arm 67 is slidably received within a sleeve block 69 of a transformer bracket 70. The sleeve block 69 may be adjustably secured upon the remote end portion 68 by set screws 71, if desired. A transformer mounting plate 72 is rigidly secured to the sleeve block 69 by the outwardly diverging brace members 73 to space the support plate 72 outwardly from the remote end of the arm 67. The current transformer 38 is rigidly secured by any appropriate connecting means, not shown, upon the outer surface of the support plate 72, as disclosed in FIG. 3, to provide sufficient room for the meter cable or wire 47 to project from the remote end portion 68 of the arm 67 and be connected to the current transformer 38.

The connector 64 is threadedly connected to the upper end portion of the meter wire conduit 75, the lower end of which is connected to the meter 45.

Thus, the meter wire 47 is completely protected from external electrical or mechanical contact, since it passes from the transformer 38 through the hollow arm 67, the hollow junction box 51 and down through the conduit 75 to the meter 45.

Identical arms 67' and 167 may have their proximate end portions fitted into the respective horizontal openings 62 in the end walls 54 and 55, and have their remote end portions supported in current transformer brackets 70' and 170, respectively identical in construction to the transformer bracket 70. Thus, as viewed in FIG. 1, the transformer bracket 70' supports the current transformer 42 in widely dispersed positions from the bracket 70 for a three-phase power distribution system.

In a similar manner, meter wires 47 from the respective current transformers 34 and 42 are led through their respective hollow arms 67' and 167 to the same junction box 51 and are thence led along with the meter wire 47 from the arm 67 down through the same connector 64 and meter wire conduit 75 to the meter 45.

Where the rack 50 is employed with a single-phase system, such as that disclosed in FIG. 2, only the single arm 67 and transformer support bracket 70 are employed for supporting a single current transformer 38.

The openings 62 in the end walls 54 and 55 are covered by closure plugs 76 to completely close the interior of the hollow junction box 51. In the single-phase system of FIG. 2, a single power line 111 and a neutral line 125 are connected to the utility pole 10. The single power transformer 120 is connected to the power line 111 through the primarly conductor lead 116, while the neutral system line 125 is connected to transformer 120 through neutral lead 100. Another neutral lead 101 connects the transformer 120 to the customer neutral line 102 at the insulator bracket 127. Secondary lines 133 and 137 connect the transformer 120 to the current transformer 38, and secondary lines 135 and 139 connect the current transformer 38 to the customer secondary lines 136 and 140.

It will thus be seen that various power distribution systems can be accommodated by the versatile support rack 50, in which one or more arms 67 and corresponding support brackets 70 may be employed in one or more of the openings 62 or 66 of the junction box 51. Where pre-formed openings, such as 62 do not receive any of the hollow arms 67, 67' or 167, they may be closed by the closure plug 75.

The rack 50 is particularly adapted not only for arranging the current transformers 34, 38 and 42 in an orderly and widely separated arrangement, but also for keeping all of the secondary wires, as well as the meter wires, completely separated and protected from each other.

Furthermore, all of the current transformers as well as the meter wires can be pre-assembled in their respective positions relative to the rack 50 before the rack 50 is mounted in its fixed position upon the utility pole 10. After the rack 50 is mounted on the utility pole 10, all that is necessary to place the system in operation is to connect the respective secondary lines 33, 35, 37, 39, 41 and 43 to the respective current transformers 34, 38 and 42.

Furthermore, the maintenance of the distribution system is improved and expedited because, after the branch lines are disconnected from the current transformers, the entire rack 50 may be dismounted and lowered to the ground for servicing, if necessary.

Furthermore, any one of the arms 67, 67' or 167 may be easily disconnected from its respective opening in the junction box 51, or any one of the brackets 70, 70' or 170 may be easily disconnected from its respective arm, if only that portion of the rack 50 is desired to be inspected or repaired.

The externally threaded depending connector 64 is also designed to be easily unthreaded from the top end of the internally threaded meter conduit 75, if desired.

The pole plate 58 is designed to extend longitudinally vertically a substantial distance for securing at its opposite upper and lower ends by the screws 60 to securely hold the rack 50 in place in order to overcome the cantilever effect, particularly of the arm 67. The radially projecting sleeve boss 63 is also designed to lend additional support to the arm 67 to overcome the cantilever effect of the rack 70.

The circular holes or openings 62 project deeper through the respective end walls 54 and 55 than the corresponding opening 66 extends through the wall section 56 to provide adequate support for the arms 67 and 167 and counteract the cantilever effect of, or moments produced by, the brackets 70' and 170, particularly when supporting their respective current transformers 34 and 42.

What is claimed is:

1. A support rack for mounting at least one transformer upon an electrical utility pole comprising:
   a. a pole bracket adapted to be mounted upon a utility pole,
   b. a hollow junction box having side walls and a bottom wall, said junction box being fixed to said pole bracket,
   c. a horizontal conductor opening through one of said side walls,
   d. an elongated hollow arm having open proximate and remote ends,
   e. said proximate end being received within said horizontal opening,
   f. a transformer support bracket,
   g. means fixing said transformer support bracket upon the remote end portion of said arm so that said remote end remains open,
   h. a meter wire opening in the bottom wall of said junction box,
   i. said arm and said junction box receiving at least one electrical conductor wire from a transformer mounted on said transformer support bracket and extending through said arm, said junction box and down through said meter wire opening to a meter mounted on said utility pole.

2. The invention according to claim 1 in which said junction box has at least three side walls, at least one horizontal opening through each of said side walls, at least one elongated hollow arm, and a closure plug for each horizontal opening not receiving the proximate end of a hollow arm.

3. The invention according to claim 2 wherein said junction box has three side walls disposed at angles to each other, a horizontal opening in each side wall and said arm supporting said transformer in a single-phase, alternating current, power transmission system, the proximate end of said bar being received in one of said horizontal openings, and two closure plugs closing the other two horizontal openings.

4. The invention according to claim 2 wherein said junction box has three side walls at angles to each other, one horizontal opening in each of said side walls, and three arms including said first arm, the proximate end of each being received in each of said horizontal openings, and said transformer support bracket fixed on the remote end of each of said arms for receiving three transformers in a three-phase, alternating current, power transmission system.

5. The invention according to claim 1 further comprising a connector depending from said meter wire opening, a meter wire conduit having upper and lower ends, the upper end of said conduit being connected to said connector, and the lower end of said conduit being adapted to be connected to said electrical meter.

6. The invention according to claim 4 in which each of said transformer support brackets comprises a sleeve block adapted to be slip-fitted over the remote end portion of each of said arms, and means for detachably securing said sleeve block to said corresponding arm, each of said transformer support brackets further comprising a transformer support plate, and means connecting said sleeve block to said transformer support plate and spacing said transformer support plate outwardly from the open remote end of said arm.

7. The invention according to claim 1 further comprising an open sleeve boss projecting outwardly and coaxially of said horizontal opening and having an inner cross-section substantially equal to the outer cross-section of the proximate end portion of said arm for receiving the proximate end portion of said arm within said sleeve boss.

8. The invention according to claim 1 in which said arm comprises a straight, elongated tubular member of electrical insulating material.

* * * * *